United States Patent
Lee et al.

(10) Patent No.: US 8,780,446 B2
(45) Date of Patent: Jul. 15, 2014

(54) BEAM GENERATING APPARATUS

(71) Applicant: Industrial Technology Research Institute, Hsinchu (TW)

(72) Inventors: Min-Kai Lee, Tainan (TW); Yu-Chung Lin, Tainan (TW); Cheng-Huan Chen, Hsinchu (TW); Sung-Ho Liu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/794,812

(22) Filed: Mar. 12, 2013

(65) Prior Publication Data

US 2014/0168780 A1 Jun. 19, 2014

(30) Foreign Application Priority Data

Dec. 17, 2012 (TW) .............................. 101147922 A

(51) Int. Cl.
    *G02B 27/10* (2006.01)
(52) U.S. Cl.
    USPC .......................................................... 359/626
(58) Field of Classification Search
    USPC .......................................................... 359/626
    See application file for complete search history.

(56) References Cited

U.S. PATENT DOCUMENTS

| | | | |
|---|---|---|---|
| 6,577,429 B1 * | 6/2003 | Kurtz et al. | 359/279 |
| 6,580,560 B1 | 6/2003 | Benner, Jr. | |
| 6,594,090 B2 | 7/2003 | Kruschwitz et al. | |
| 6,747,781 B2 | 6/2004 | Trisnadi | |
| 6,859,326 B2 | 2/2005 | Sales | |
| 7,762,673 B2 | 7/2010 | Kim et al. | |
| 7,884,303 B2 | 2/2011 | Partlo et al. | |
| 8,148,663 B2 | 4/2012 | Adams et al. | |

FOREIGN PATENT DOCUMENTS

| | | |
|---|---|---|
| CN | 102081236 | 6/2011 |
| TW | 582062 | 4/2004 |
| TW | I348183 | 9/2011 |

OTHER PUBLICATIONS

Green Line—LIMO, Retrieved from http://www.limo.de/en/limo-produkte/strahlformungssysteme/gruene-linie-annealing/ on Jan. 21, 2013.

(Continued)

*Primary Examiner* — James Jones
(74) *Attorney, Agent, or Firm* — Jianq Chyun IP Office

(57) ABSTRACT

A beam generating apparatus includes a laser light source, a speckle suppressing module, a light homogenizing module and a driving unit. The laser light source outputs a laser beam. The speckle suppressing module includes two biconic lenses and a diffuser. The first biconic lens is disposed on a transmission path of the laser beam. The diffuser is located on the transmission path of the laser beam between the first and second biconic lenses. The light homogenizing module is disposed on the transmission path of the laser beam from the second biconic lens. The driving unit drives the diffuser to move with respect to the laser beam so that the ratio of the $M^2$ of the laser beam exiting from the second biconic lens in a first direction to the $M^2$ thereof in a second direction is greater than 2, wherein the two directions are substantially perpendicular to each other.

17 Claims, 9 Drawing Sheets

(56) References Cited

OTHER PUBLICATIONS

Green Line Laser Annealing for Thin-Film Crystallisation, Retrieved from http://www.limo.de/fileadmin/PDF/Green_line_laser_annealing_01.pdf, Version May 8, 2012, pp. 1-2.

Bitterli et al., "Refractive statistical concave 1D diffusers for laser beam shaping," Proc. of SPIE vol. 7062, Sep. 2008, pp. 70620P-1-70620P-8.

Wippermann et al., "Beam homogenizers based on chirped microlens arrays," Optics Express 15(10), May 14, 2007, pp. 6218-6231.

Daniels et al., "Generation of uniform lines with variable size using a beam shaping hybrid zoom optical system," Proc. of SPIE vol. 5175, Aug. 2009, pp. 24-38.

Miklyaev et al., "Beam shaping on the base of micro lenslet arrays with the help of diffraction and interference effects," Proc. of SPIE vol. 6663, Sep. 2007, pp. 666308-1-666308-8.

Homburg et al., "Refractive beam shaping—from Maxwell's Equations to products and applications in laser materials processing," Proc. of SPIE vol. 6663, Sep. 2007, pp. 66630D-1-66630D-12.

* cited by examiner

US 8,780,446 B2

BEAM GENERATING APPARATUS

CROSS-REFERENCE TO RELATED APPLICATION

This application claims the priority benefit of Taiwan application serial no. 101147922, filed on Dec. 17, 2012. The entirety of the above-mentioned patent application is hereby incorporated by reference herein and made a part of this specification.

TECHNICAL FIELD

The technical field relates to a beam generating apparatus.

BACKGROUND

The laser beam is well known for high collimation, high power and high light intensity, so that the laser beam apparatus has very wide applications in modern industries, such as highly-collimated light source in laboratory, laser pen used to point at screen of a briefing, laser light source adopted in reading or burning disks, laser light source adopted by a mouse, laser light sources for a variety of measuring instruments, laser light source in display field, laser light source in optic fibber communications, even laser light source for the instruments in the biomedical field.

Since the laser beam emitted by a laser beam has high coherence and therefore, when the laser beam irradiates a non-smooth surface of an object (such as lenses, reflectors, etc.), the laser beam reflected from the object surface produces interference and speckles on the irradiated surface. Speckles are irregular noise-like pattern (for example, irregular bright and dark messy spots), it will result in non-uniform illumination on the irradiated surface to degrade the optical quality of the apparatus employing the laser light source.

SUMMARY

An exemplary embodiment provides a beam generating apparatus, which includes a laser light source, a speckle suppressing module, a light homogenizing module and a driving unit. The laser light source outputs a laser beam. The speckle suppressing module includes a first biconic lens, a diffuser and a second biconic lens. The first biconic lens is disposed on a transmission path of the laser beam. The diffuser is disposed on the transmission path of the laser beam from the first biconic lens. The second biconic lens is disposed on the transmission path of the laser beam from the diffuser. The light homogenizing module is disposed on the transmission path of the laser beam from the second biconic lens. The driving unit drives the diffuser to move with respect to the laser beam so that the ratio of M squared ($M^2$) of the laser beam exiting from the second biconic lens in a first direction to $M^2$ of the laser beam exiting from the second biconic lens in a second direction is greater than 2, wherein the first direction is substantially perpendicular to the second direction.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
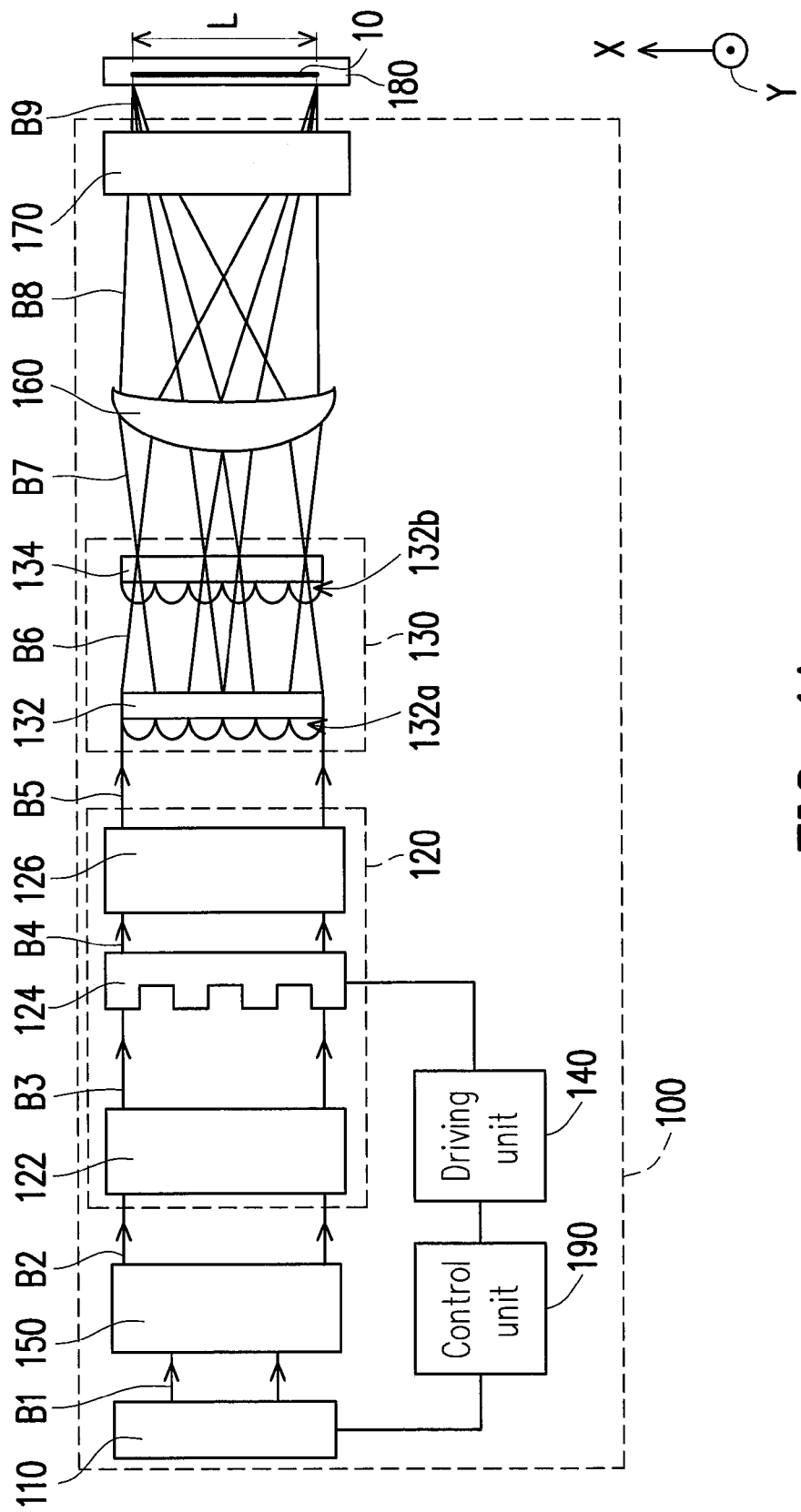
FIG. 1A is a top-view diagram of a beam generating apparatus according to an exemplary embodiment.
Figure 1B:
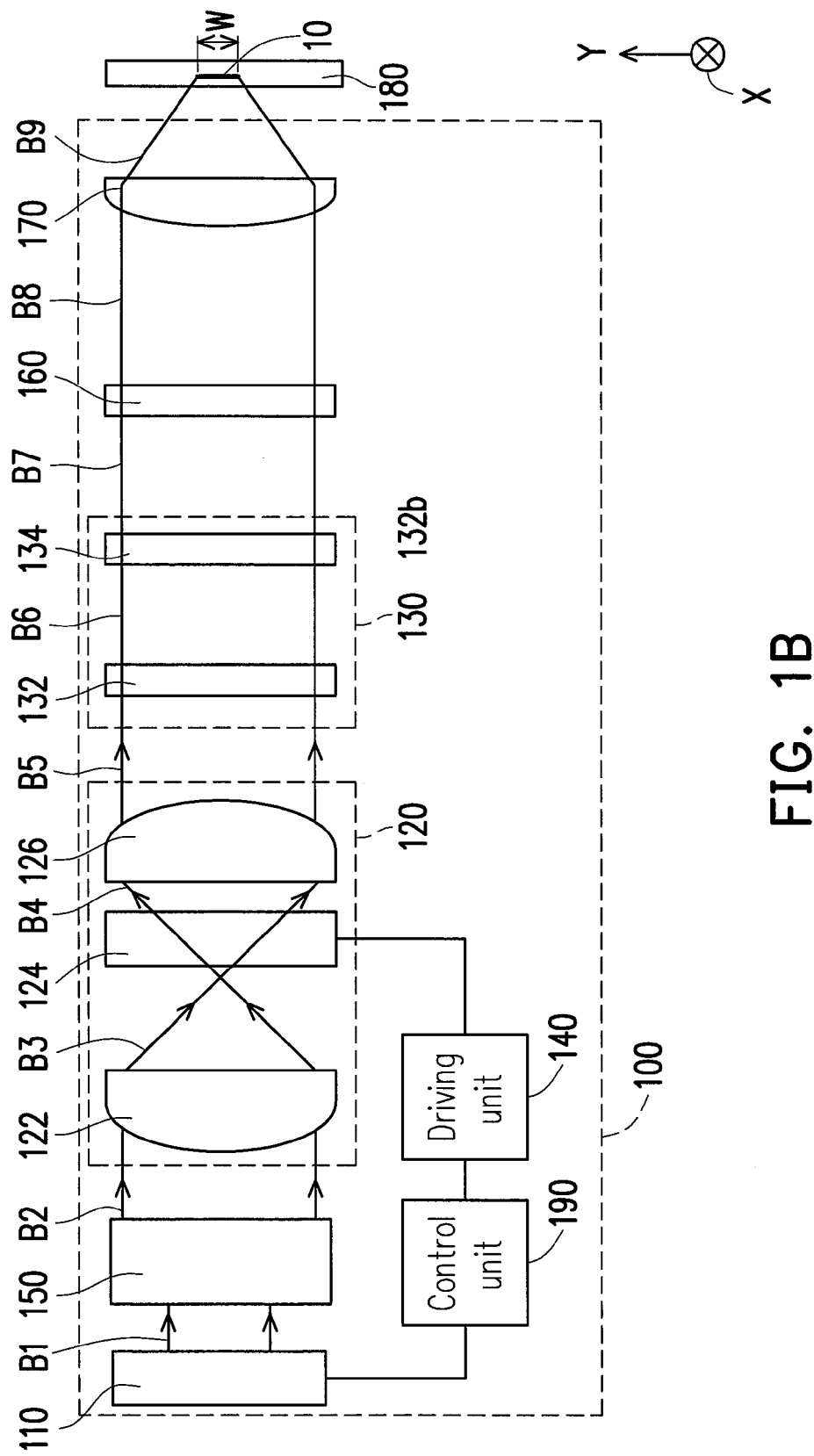
FIG. 1B is a side-view diagram of the beam generating apparatus of FIG. 1A.

FIG. 1A is a top-view diagram of a beam generating apparatus according to an exemplary embodiment and FIG. 1B is a side-view diagram of the beam generating apparatus of FIG. 1A. Referring to FIGS. 1A and 1B, a beam generating apparatus 100 of the embodiment includes a laser light source 110, a speckle suppressing module 120, a light homogenizing module 130 and a driving unit 140. The laser light source 110 outputs a laser beam B1. In the embodiment, the laser beam B1 is, for example, a pulse laser beam.

The beam generating apparatus 100 in the embodiment can further include a beam-expanding unit 150 disposed on the transmission path of the laser beam B1 and located between the laser light source 110 and the speckle suppressing module 120, in which the diameter of the laser beam B2 after passing through the beam-expanding unit 150 ranges, for example, from 10 mm to 20 mm. In addition, the wavelength of the laser beam B1 is, for example, in a range of 100 nm to 1000 μm. However, the embodiment does not limit the wavelength range of the laser beam B1 or the diameter range of the laser beam B2.

The major function of the speckle suppressing module 120 is to redistribute energy of the incident laser beam B2. The speckle suppressing module 120 includes a first biconic lens 122, a diffuser 124 and a second biconic lens 126. The first biconic lens 122 is disposed on the transmission path of the laser beam B2, and the laser beam B2 after passing through the first biconic lens 122 forms a laser beam B3. The diffuser 124 is disposed on the transmission path of the laser beam B3 from the first biconic lens 122, and the laser beam B3 after passing through the diffuser 124 forms a laser beam B4. The second biconic lens 126 is disposed on the transmission path of the laser beam B4 from the diffuser 124, and the laser beam B4 after passing through the second biconic lens 126 forms a laser beam B5.

The light homogenizing module 130 is disposed on the transmission path of the laser beam B5 from the second biconic lens 126. The driving unit 140 is coupled to the diffuser 124 and drives the diffuser 124 to move with respect to the laser beam B3 so as to modulate the $M^2$ of the laser beam B5 exiting from the second biconic lens 126 in different directions. In the embodiment, the driving unit 140 is an actuator, for example, a motor or other appropriate actuation devices, which is able to drive the diffuser 124 to move.

The $M^2$ means the ratio of the beam parameter product (BPP) of a real laser beam over the BPP of the ideal Gaussian beam with the same wavelength, and the $M^2$ is defined by:

$$M^2 = \frac{2W_m \cdot 2\theta_m}{4\lambda/\pi}$$

wherein $W_m$ is radius of the beam waist (i.e., the narrowest position of a laser beam) of a laser beam, $\theta_m$ is the divergence angle (half angle) of the laser beam. The $M^2$ of an ideal Gaussian beam is 1, which means when the $M^2$ of a laser light source is closer to 1, the energy distribution of the real laser beam is closer to the energy distribution of the ideal Gaussian beam. In other words, the laser beam in this case has good quality and high coherence.

Figure 2A:
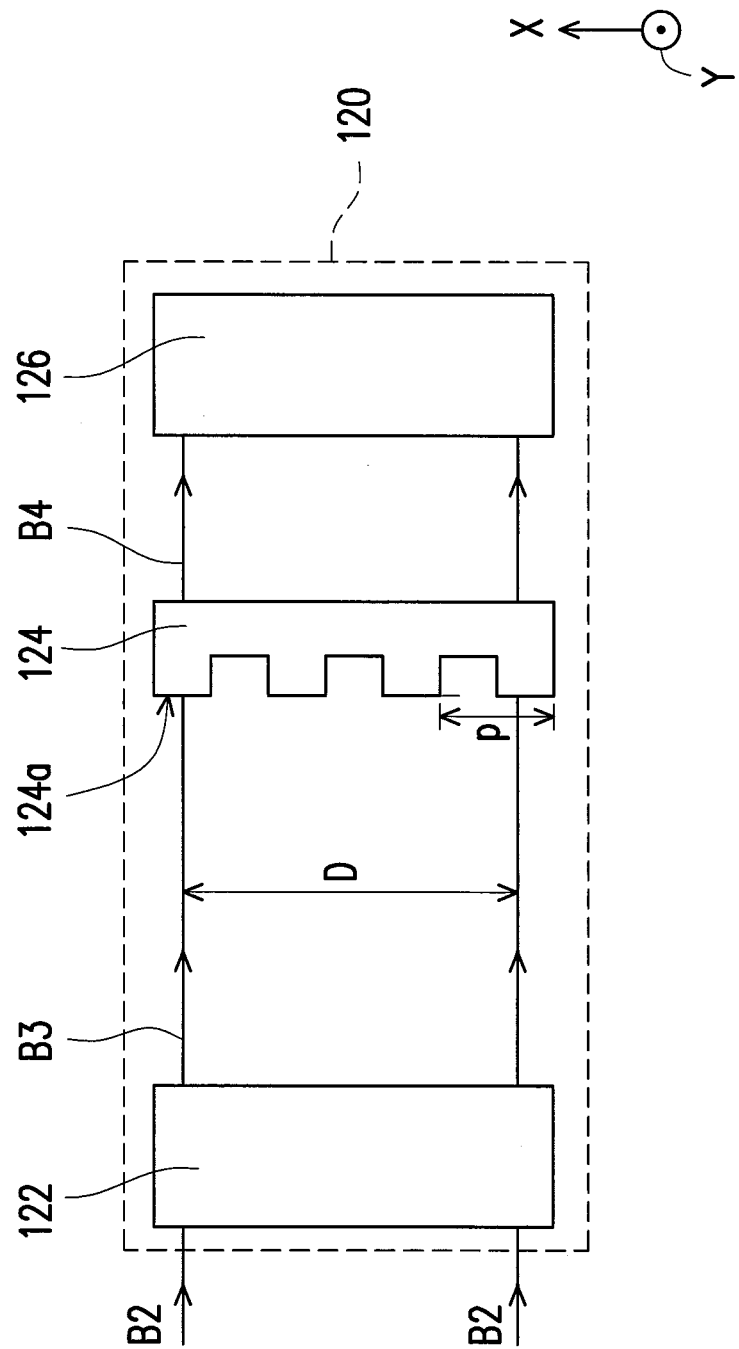
FIG. 2A is an enlarged diagram of the speckle suppressing module of FIG. 1A.
Figure 2B:
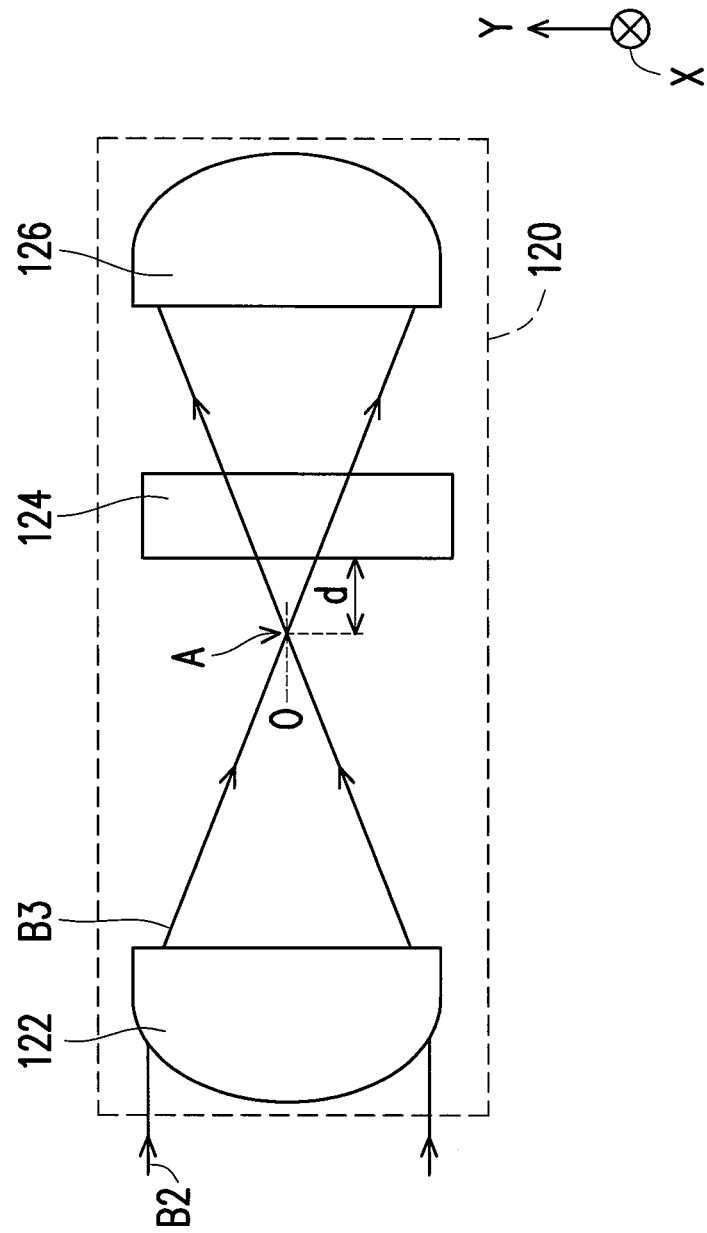
FIG. 2B is an enlarged diagram of the speckle suppressing module of FIG. 1B.

In following, the speckle suppressing module in FIGS. 2A and 2B are described. FIG. 2A is an enlarged diagram of the speckle suppressing module 120 of FIG. 1A and FIG. 2B is an enlarged diagram of the speckle suppressing module 120 of FIG. 1B. In this embodiment, the first biconic lens 122 and the second biconic lens 126 are, for example, cylindrical lenses. Referring to FIGS. 2A and 2B, the curved surfaces of the first biconic lens 122 and the second biconic lens 126 are not curved in the first direction X (shown by FIG. 2A), but are curved in the second direction Y (shown by FIG. 2B). In the embodiment, the first direction X is substantially, for example, perpendicular to the second direction Y.

In addition, the curved surface of the first biconic lens 122 in the embodiment, for example, faces the laser light source 110 (shown by FIG. 1B) and the curved surface of the second biconic lens 126, for example, faces the light homogenizing module 130 (shown by FIG. 1B). Moreover, the curved surfaces of the first biconic lens 122 and the second biconic lens 126 are symmetrically disposed, which the disclosure is not limited to.

Referring to FIG. 2B, the laser beam B3 passing through the first biconic lens 122 has a beam waist A (i.e., the narrowest place of the laser beam B3) between the first biconic lens 122 and the second biconic lens 126. In the embodiment, the diffuser 124 is located between the beam waist A and the second biconic lens 126. In addition, the cross-section of the laser beam B3 at the beam waist A is a linear cross-section and the linear cross-section extends along the first direction X.

Figure 3A:
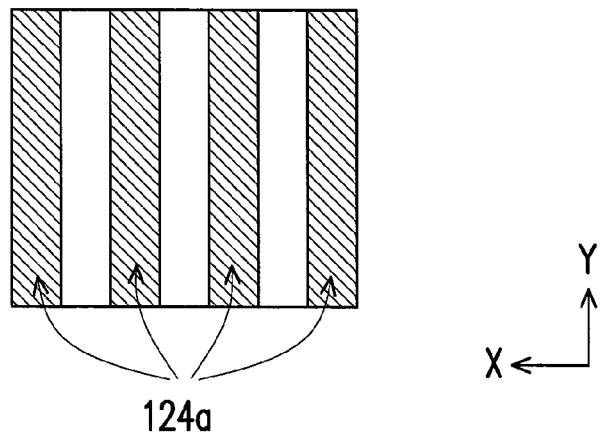
FIG. 3A is a top-view diagram of the diffuser in FIGS. 2A and 2B.
Figure 3B:
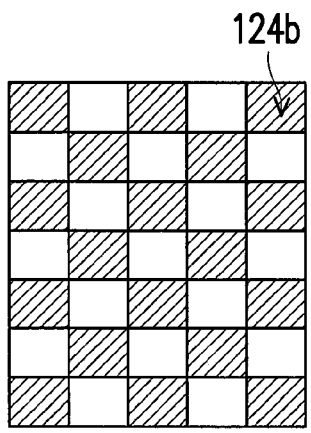
FIGS. 3B and 3C illustrate other implementations of the micro-structures of the diffuser.
Figure 3C:
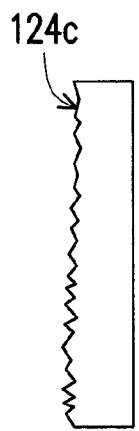

The diffuser 124 is, for example, a plurality of micro-structures 124a facing the first biconic lens 122 and the tops of the micro-structures 124a are separated from the beam waist A by a distance d. FIG. 3A is a top-view diagram of the diffuser 124 in FIGS. 2A and 2B. Referring to FIG. 3A, the micro-structures 124a in the embodiment are, for example, a plurality of periodically-arranged one-dimensional structures, in which the micro-structures 124a, for example, extend along the second direction Y and are arranged along the first direction X. The implementation of the micro-structures 124a is not limited thereto. FIGS. 3B and 3C illustrate other implementations of the micro-structures of the diffuser. Referring to FIG. 3B, the micro-structures 124b of the diffuser 124 can be a plurality of periodically-arranged two-dimensional structures, in which the micro-structures 124b are, for example, distributed in array. FIG. 3C is a side-view diagram of the diffuser. Referring to FIG. 3C, the micro-structures 124c of the diffuser can be also a plurality of irregularly arranged two-dimensional structures; or, the micro-structures 124a in FIG. 3A and the micro-structures 124b in FIG. 3B are in random arrangement.

In the embodiment, by means of the moving of the diffuser 124 of the speckle suppressing module 120 with respect to the laser beam B3, the $M^2$ of the laser beam B5 exiting from the second biconic lens 126 in different directions can be modulated so as to improve the speckle phenomena and to obtain a linear spot 10 with uniform brightness. In following, FIGS. 1B and 2B are more explained.

Referring to FIGS. 1B and 2B, the driving unit 140 drives the diffuser 124 to move with respect to the laser beam B3. Specifically, the diffuser 124 can make rotation or make reciprocative translational vibration. In the embodiment, the diffuser 124 shown by FIG. 3A is employed and the diffuser 124, for example, makes reciprocative translational vibration along the first direction X, which the disclosure is not limited to. In another embodiment, the diffuser 124 may also make reciprocative translational vibration in other directions or rotating. For example, by employing the diffuser 124 of FIG. 3B, the diffuser 124 can rotate around a rotation shaft (not shown) and the rotation shaft is, for example, parallel to the center axis O of the laser beam B3. In addition, by employing the diffuser 124 of FIG. 3C, the reciprocative translational vibration along the first direction X of the diffuser 124 has the similar effect to the above-mentioned embodiment. The diffuser 124 can also make reciprocative translational vibration along the transmission direction of the laser beam B3 between the beam waist A and the second biconic lens 126. In addition, the diffuser 124 in FIG. 3C can rotate around a rotation shaft (not shown) and the rotation shaft is, for example, parallel to the center axis O of the laser beam B3.

In the embodiment, the number of the micro-structures 124a swept by the center axis O of the laser beam B3 during an action time t is M, the average rate v of movement of the diffuser 124 can be expressed by the following formula:

$$v = \frac{M \times p}{t}$$

The average rate v of movement of the diffuser 124 is in direct proportion to the number M multiplied by pitch p and then divided by the action time t. In the embodiment, the ratio of the pulse repetition frequency of the laser beam B3 over the average rate of movement of the location irradiated by the laser beam B3 is, for example, less than or equal to 500. In more details, the beam generating apparatus 100 of the embodiment can further include a control unit 190 electrically connected to the laser light source 110 and the driving unit 140, so that the pulse repetition frequency of the laser beam B3 and the average rate of movement of the place of the diffuser 124 irradiated by the laser beam B3 can be in coordination with each other to ensure every pulse to have full effect on the diffuser 124. As a result, the $M^2$ of the laser beam B5 exiting from the second biconic lens 126 in different directions get modulated. In another embodiment, the laser light source 110 can be a continuous wave laser light source, where there is no issue of the coordination between the pulse repetition frequency of the laser beam B3 and the average rate of movement of the location of the diffuser 124 irradiated by the laser beam B3.

The ratio ($M_x^2/M_y^2$) of the M squared ($M_x^2$) of the laser beam B5 exiting from the second biconic lens 126 in the first direction X and the M squared ($M_y^2$) of the laser beam B5 exiting from the second biconic lens 126 in the second direction Y is, for example, greater than 2. Taking an example, the $M_x^2$ of the laser beam B5 in the first direction X in the embodiment is, for example, greater than 10, and the $M_y^2$ of the laser beam B5 in the second direction Y is, for example, less than 2

Figure 4A:
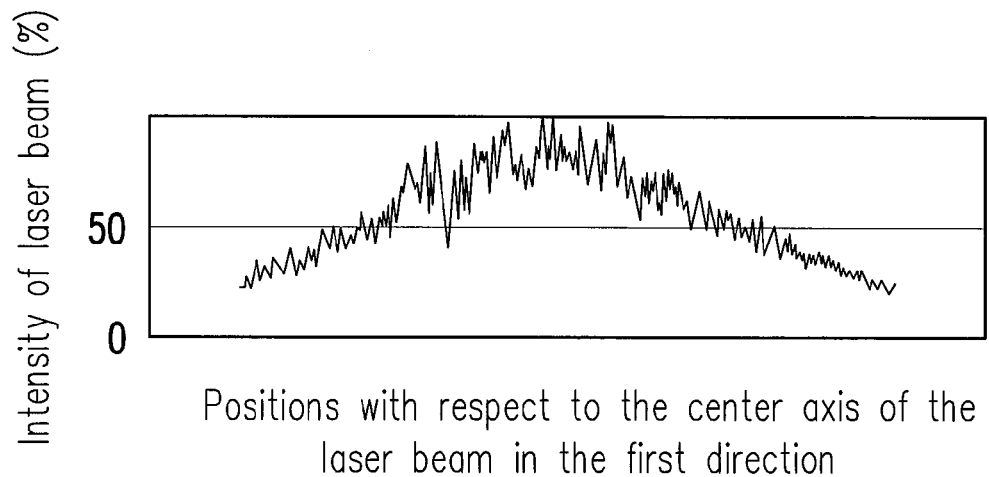
FIGS. 4A and 4B are two charts showing the laser beam intensities to the positions with respect to the center axis of the laser beam in the first direction and the second direction for a diffuser which does not move with respect to the laser beam.
Figure 4B:
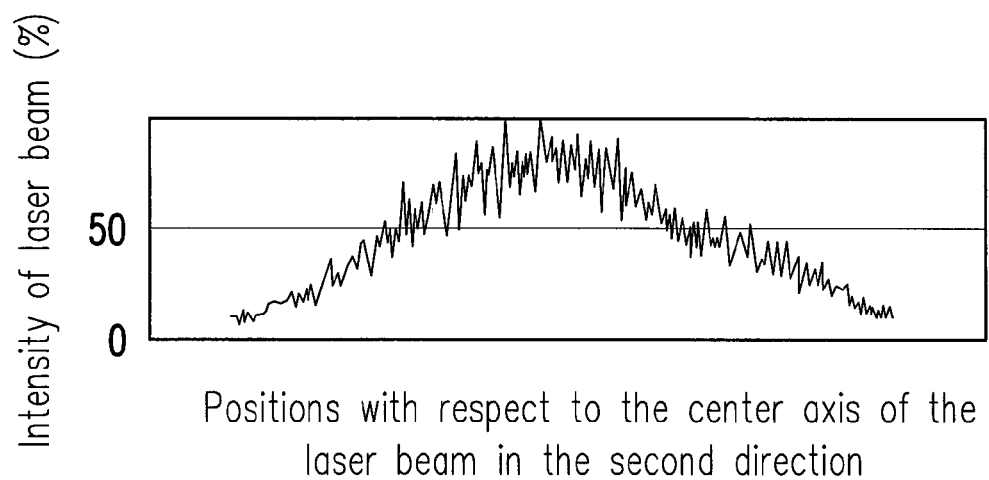
Figure 5:
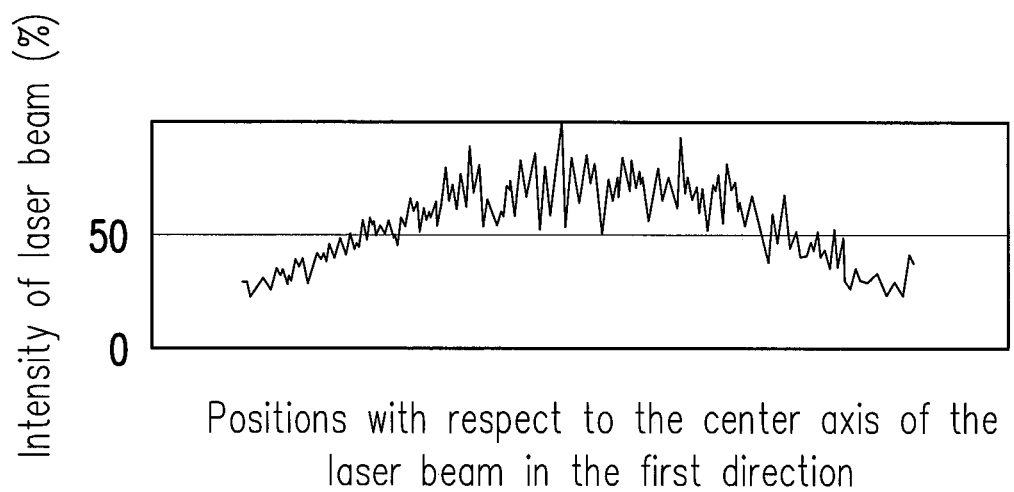
FIG. 5 is a chart showing the laser beam intensities to the positions with respect to the center axis of the laser beam in the first direction for a diffuser which is moving with respect to the laser beam.

FIGS. 4A and 4B are two charts showing the laser beam intensities to the positions with respect to the center axis of the laser beam in the first direction and the second direction for a diffuser which does not move with respect to the laser beam. FIG. 5 is a chart showing the laser beam intensities to the positions with respect to the center axis of the laser beam in the first direction for a diffuser which is moving with respect to the laser beam.

Referring to FIGS. 4A and 4B, when the diffuser does not make moving with respect to the laser beam, the M squared of the laser beam in the first direction X is similar to the M squared of the laser beam in the second direction Y. That is, the relationship of the light intensities with respect to the positions for the laser beam in the first direction is similar to the relationship of the light intensities with respect to the positions for the laser beam in the second direction, in which the relationship of the light intensities with respect to the positions is, for example, close to a Gaussian distribution.

Referring to FIG. 5, when the diffuser is making moving with respect to the laser beam, the M squared of the laser beam in the first direction X is changed. In particular, when the light intensity of the laser beam in FIG. 5 is greater than 50%, in comparison with FIG. 4A, the peaks of the light intensities of the laser beam, with respect to the positions, are more flat, and the full width at half maximum (FWHM) of the light intensities of the laser beam in FIG. 5 is greater than the FWHM of the light intensities of the laser beam in FIG. 4A. In addition, in terms of the second direction Y, when the diffuser is making moving with respect to the laser beam, it still can keep the above-mentioned distribution close to the Gaussian distribution of FIG. 4B. In other words, the embodiment can, by means of the moving of the diffuser with respect to the laser beam, change the M squared of the laser beam in the first direction, so that the distribution of the light intensities of the laser beam passing through the speckle suppressing module in the first direction is more uniform.

Referring to FIGS. 1A and 1B again, for the laser beam B5 generated by the laser beam B2 after passing through the speckle suppressing module 120 in the embodiment, the uniformity U of the laser beam B5 can be expressed by, for example, the following formula:

$$U = k_1 \sum_{pulse=1}^{N} D_{pulse} \cdot v$$

wherein $k_1$ is a proportional constant and N is the number of pulses. The uniformity U of the laser beam B5 is in direct proportion to the product of the action width D on the diffuser 124 irradiated by the laser beam B3 and the average rate v of movement of the diffuser 124. That is to say, by appropriately increasing the average rate v of movement of the diffuser 124 or increasing the action width D on the diffuser 124 irradiated by the laser beam B3, the uniformity U of the laser beam B5 in the embodiment can be advanced so as to improve the speckle phenomena of the linear spot 10.

The light homogenizing module 130 is mainly in charge of changing the incident laser beam B5 into a linear shape one. The light homogenizing module 130 of the embodiment includes a first lenticular lens array 132 and a second lenticular lens array 134. The first lenticular lens array 132 is disposed on the transmission path of the laser beam B5 from the second biconic lens 126. The laser beam B5 after passing through the first lenticular lens array 132 forms a laser beam B6. The second lenticular lens array 134 is disposed on the transmission path of the laser beam B6 from the first lenticular lens array 132.

In more details, the first lenticular lens array 132 includes a plurality of first lenticular lenses 132a, each of the first lenticular lenses 132a extends along the second direction Y and the first lenticular lenses 132a are arranged along the first direction X. The second lenticular lens array 134 includes a plurality of second lenticular lenses 134a, each of the second lenticular lenses 134a extends along the second direction Y and the second lenticular lenses 134a are arranged along the first direction X. In the embodiment, the curved surfaces of the first lenticular lenses 132a and the curved surfaces of the second lenticular lenses 134a, for example, face the speckle suppressing module 120.

The beam generating apparatus 100 in the embodiment further includes a condenser lens 160 and a third biconic lens 170. In this embodiment, the third biconic lens 170 is, for example, a cylindrical lens. The condenser lens 160 is disposed on the transmission path of the laser beam B7 from the light homogenizing module 130 and located between the light homogenizing module 130 and the third biconic lens 170. In the embodiment, the condenser lens 160 can be a biconic lens, e.g. a cylindrical lens. In addition, the curved surface of the condenser lens 160 is curved in the first direction X (referring to FIG. 1A), but not curved in the second direction Y (referring to FIG. 1B). The third biconic lens 170 is disposed on the transmission path of the laser beam B8 from the condenser lens 160. In the embodiment, the curved surface of the third biconic lens 170 is not curved (referring to FIG. 1A) in the first direction X, but is curved in the second direction Y (referring to FIG. 1B). The condenser lens 160 in the embodiment is for overlapping the laser beam B7 in the first direction X into a light spot with major axis L and the third biconic lens 170 is for shrinking the laser beam B8 in the second direction Y into the light spot with minor axis W.

The curved surface of the third biconic lens 170 in the embodiment faces the speckle suppressing module 120; but in other embodiments, the curved surface of the third biconic lens 170 can face away from the speckle suppressing module 120. The third biconic lens 170 condenses the laser beam B8 from the condenser lens 160 so as to output the laser beam B9 and form the linear spot 10 on an object to be irradiated 180 (or an object to be processed). In other words, the beam generating apparatus 100 is, for example, a linear beam generating apparatus 100.

The laser beam B8 is incident on the light homogenizing module 130, the condenser lens 160 and the third biconic lens 170 so as to further advance the uniformity thereof or change the ratio L/W of the major axis to the minor axis to generate the linear spot 10. The length of the major axis of the linear spot 10 is L, and the length of the minor axis of the linear spot 10 is W, wherein L/W meets the following formula:

$L/W = k_2 p/d$

In the formula, $k_2$ is a proportional constant and L/W is in direct proportion to p/d. Therefore, the ratio L/W of the major axis to the minor axis of the linear spot 10 is increased along with increasing the pitch p of the micro-structures 124a, or along with reducing the distance d between the tops of the micro-structures 124a and the beam waist A. When the ratio L/W of the major axis to the minor axis of the linear spot 10 is increased, if, for example, the major axis length L of the linear spot 10 keeps unchanged, and the minor axis length W of the linear spot 10 is decreased, then the energy per unit area of the linear spot 10 is increased. On the other hand, when the ratio L/W of the major axis to the minor axis of the linear spot 10 is increased, if, for example, the minor axis length W of the linear spot 10 keeps unchanged, and the major axis length L is increased, then the irradiation length of the linear spot 10 is advanced so that the application range of the beam generating apparatus 100 is expanded.

Taking an example, the beam generating apparatus 100 can be used for modifying indium tin oxide (ITO). Sensing electrode material of the currently commercially-available capacitive touch panel is mostly based on indium tin oxide (ITO), in which durability, weather resistance and resistance stability of the ITO will significantly affect the quality of the capacitive touch panel. Since the crystallized ITO has good durability, weather resistance and resistance stability, thus, the electronic products in general industries and computers or the electronic products with higher grade would select the crystallized ITO serving as the material of sensing electrodes. However, the full-crystallized ITO film is quite expensive. If directly purchasing the full-crystallized ITO film for fabricating the sense electrodes, the cost of the touch panel is increased and disadvantageous on commercial competition.

By using the beam generating apparatus 100 of the embodiment to generate the linear spot 10 and using the linear spot 10 to irradiate non-crystalline ITO, the non-crystalline ITO gets crystallized, which, in addition to advance the durability of a touch panel, can further avoid purchasing the full-crystallized ITO film to increase the cost of the touch panel. In addition, by modulating the pitch p of the micro-structures 124a or reducing the distance d between the tops of the micro-structures 124a and the beam waist A, the energy per unit area of the linear spot 10 in the embodiment is relatively high or the irradiation length is relatively long. As a result, by using the linear spot 10 generated by the beam generating apparatus 100 of the embodiment to crystallize the ITO film, the crystallizing extent per unit area of the ITO film or the crystallizing area per unit time of the ITO film can be advanced. When using the linear spot 10 generated by the beam generating apparatus 100 to modify the ITO film, the major axis length L of the linear spot 10 can be greater than or equal to the width of the ITO film, and the ITO film can move along the direction substantially perpendicular to the major axis direction of the linear spot 10 to pass through the linear spot 10. Then, after the ITO film passes through the linear spot 10 and gets cooling, the modification of the ITO film is finished.

By appropriately increasing the average rate of movement of the diffuser 124 or increasing the action width D on the diffuser 124 irradiated by the laser beam B3 in the embodiment, the speckle phenomena of the linear spot 10 generated by the beam generating apparatus 100 can be improved, which further makes the luminance of the linear spot 10 more uniform. Therefore, by using the linear spot 10 generated by the beam generating apparatus 100 in the embodiment to crystallize the ITO film, the crystallization of the ITO film is more uniform and the total stability of the touch panel is advanced.

Figure 6A:
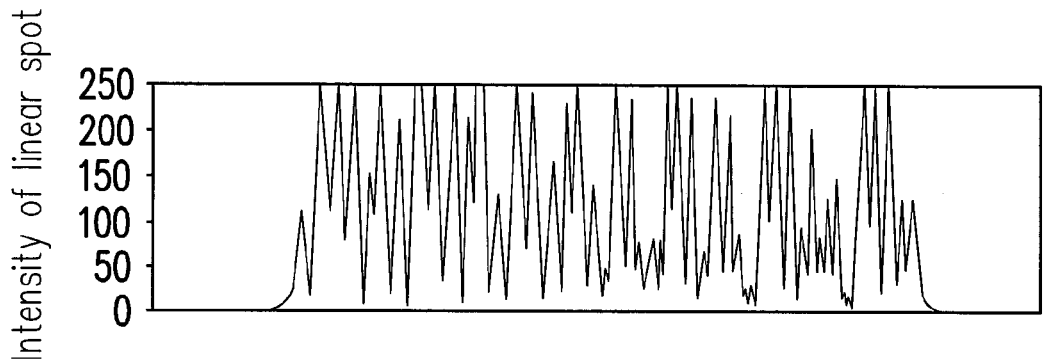
FIGS. 6A and 6B are two charts showing the linear spot intensities to the positions with respect to the center axis of the linear spot in the first direction and the second direction for a diffuser which does not move with respect to the laser beam.
Figure 6B:
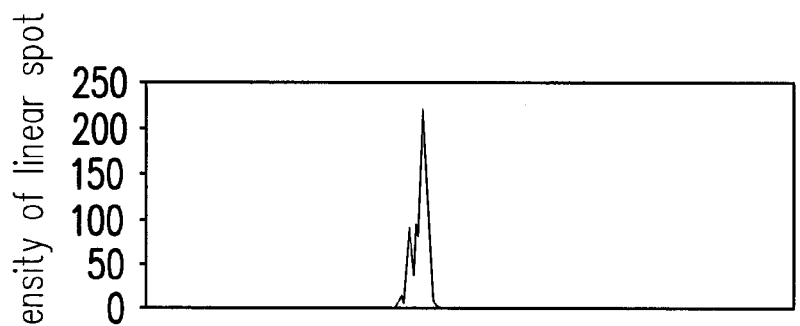
Figure 7A:
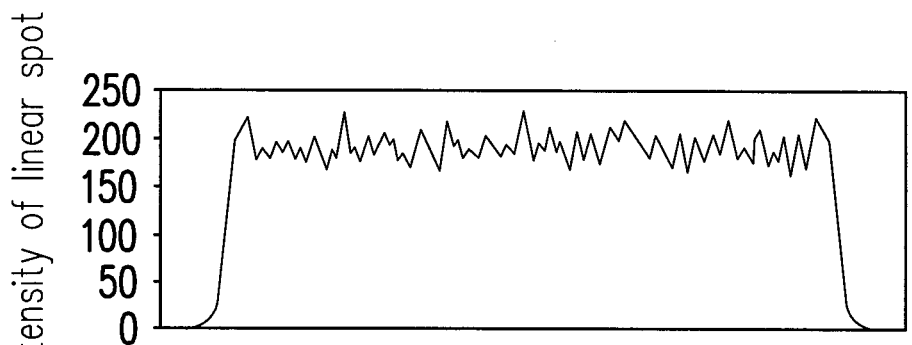
FIGS. 7A and 7B are two charts showing the linear spot intensities to the positions with respect to the center axis of the linear spot in the first direction and the second direction for a diffuser which is moving with respect to the laser beam.
Figure 7B:
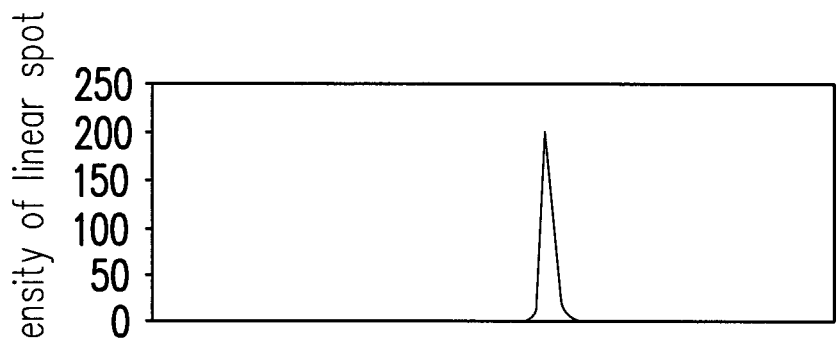

FIGS. 6A and 6B are two charts showing the linear spot intensities to the positions with respect to the center axis of the linear spot in the first direction and the second direction for a diffuser which does not move with respect to the laser beam. FIGS. 7A and 7B are two charts showing the linear spot intensities to the positions with respect to the center axis of the linear spot in the first direction and the second direction for a diffuser which is moving with respect to the laser beam.

It can be seen from FIGS. 6A and 6B that when the diffuser does not move with respect to the laser beam, the intensity of the linear spot 10 present on the object to be irradiated is messy in the first direction and the second direction, which indicates the linear spot in the embodiment of FIGS. 6A and 6B is affected by the interference of the speckle phenomena, which results in un-uniform luminance of the image frame on a screen. In comparison with FIGS. 6A and 6B, the diffuser of FIGS. 7A and 7B is making moving with respect to the laser beam, so that the intensity of the linear spot in the first direction is more uniform and the intensity of the linear spot in the second direction is more concentrated. It can be seen that by means of the moving of the diffuser of the speckle suppressing module with respect to the laser beam, the $M^2$ of the laser beam exiting from the second biconic lens on different directions can be modulated, which improves the speckle phenomena of the linear spot and forms a linear spot with uniform luminance.

In summary, in the embodiments of the disclosure, the speckle suppressing module is disposed between the laser light source and the light homogenizing module, and the diffuser of the speckle suppressing module makes moving with respect to the laser beam so as to advance the ratio of the $M^2$ of the laser beam in the first direction to the $M^2$ of the laser beam in the second direction. In this way, the speckle phenomena gets improved and further, the intensity of the linear spot generated by the beam generating apparatus is more uniform.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A beam generating apparatus comprising:
    a laser light source, outputting a laser beam;
    a speckle suppressing module, comprising:
        a first biconic lens, disposed on a transmission path of the laser beam;
        a diffuser, disposed on the transmission path of the laser beam from the first biconic lens; and
        a second biconic lens, disposed on the transmission path of the laser beam from the diffuser;
    a light homogenizing module, disposed on the transmission path of the laser beam from the second biconic lens, wherein the laser beam is transmitted to the first biconic lens, the diffuser, the second biconic lens and the light homogenizing module in sequence; and
    a driving unit, driving the diffuser to move with respect to the laser beam so that a ratio of M squared of the laser beam exiting from the second biconic lens in a first direction to M squared of the laser beam exiting from the second biconic lens in a second direction is greater than 2, wherein the first direction is substantially perpendicular to the second direction.

2. The beam generating apparatus as claimed in claim 1, wherein a curved surface of the first biconic lens and a curved surface of the second biconic lens are not curved in the first direction but are curved in the second direction.

3. The beam generating apparatus as claimed in claim 2, wherein the curved surface of the first biconic lens faces the laser light source and the curved surface of the second biconic lens faces the light homogenizing module.

4. The beam generating apparatus as claimed in claim 1, wherein the laser beam is a pulse laser beam, and a ratio of pulse repetition frequency of the laser beam to a average rate of movement of a location of the diffuser irradiated by the laser beam is less than or equal to 500.

5. The beam generating apparatus as claimed in claim 4, further comprising a control unit electrically connected to the laser light source and the driving unit.

6. The beam generating apparatus as claimed in claim 1, wherein a wavelength of the laser beam ranges from 100 nm to 1000 μm.

7. The beam generating apparatus as claimed in claim 1, wherein the driving unit drives the diffuser to rotate.

8. The beam generating apparatus as claimed in claim 1, wherein the driving unit drives the diffuser to make reciprocative translational vibration.

9. The beam generating apparatus as claimed in claim 8, wherein the diffuser makes reciprocative translational vibration along the first direction.

10. The beam generating apparatus as claimed in claim 1, wherein the light homogenizing module comprises:
  a first lenticular lens array, disposed on the transmission path of the laser beam from the second biconic lens; and
  a second lenticular lens array, disposed on the transmission path of the laser beam from the first lenticular lens array.

11. The beam generating apparatus as claimed in claim 10, wherein the first lenticular lens array comprises a plurality of first lenticular lenses, each of the first lenticular lenses extends along the second direction, the first lenticular lenses are arranged along the first direction, the second lenticular lens array comprises a plurality of second lenticular lenses, each of the second lenticular lenses extends along the second direction, and the second lenticular lenses are arranged along the first direction.

12. The beam generating apparatus as claimed in claim 1, further comprising a condenser lens and a third biconic lens, wherein the condenser lens is disposed on the transmission path of the laser beam and located between the light homogenizing module and the third biconic lens.

13. The beam generating apparatus as claimed in claim 12, wherein the laser beam after passing through the light homogenizing module, the condenser lens and the third biconic lens generates a linear spot, the major axis of the linear spot is L, the minor axis of the linear spot is W, the diffuser has a plurality of micro-structures in periodical arrangement, the laser beam has a beam waist between the first biconic lens and the second biconic lens, the diffuser is located between the beam waist and the second biconic lens, the tops of the micro-structures is separated from the beam waist by a distance d, and a pitch of the micro-structures is p, wherein L/W is in direct proportion to p/d.

14. The beam generating apparatus as claimed in claim 12, wherein a curved surface of the third biconic lens faces the speckle suppressing module.

15. The beam generating apparatus as claimed in claim 12, wherein a curved surface of the third biconic lens is not curved in the first direction but curved in the second direction.

16. The beam generating apparatus as claimed in claim 1, further comprising:
  a beam-expanding unit, disposed on the transmission path of the laser beam and located between the laser light source and the speckle suppressing module.

17. The beam generating apparatus as claimed in claim 1, wherein the laser light source is a continuous wave laser light source.

* * * * *